United States Patent [19]

Hageman

[11] Patent Number: 4,889,457
[45] Date of Patent: Dec. 26, 1989

[54] LOAD INDICATOR

[75] Inventor: David C. Hageman, Bainbridge, Ohio

[73] Assignee: Premier Industrial Corporation, Cleveland, Ohio

[21] Appl. No.: 194,302

[22] Filed: May 16, 1988

Related U.S. Application Data

[63] Continuation-in-part of Ser. No. 179,965, Apr. 11, 1988, abandoned.

[51] Int. Cl.[4] ............................................. F16B 31/12
[52] U.S. Cl. ........................................ 411/10; 411/34; 411/371
[58] Field of Search ..................................... 411/8–11, 411/34, 371, 535

[56] References Cited

U.S. PATENT DOCUMENTS

| | | | |
|---|---|---|---|
| 1,320,622 | 11/1919 | Kennedy | 411/34 |
| 1,365,719 | 1/1921 | Ogden | 411/34 |
| 2,546,332 | 10/1946 | Costello | 411/9 |
| 2,570,863 | 10/1951 | Rowe | 411/9 |
| 3,174,386 | 3/1965 | Lewis | 411/10 |
| 3,306,154 | 2/1967 | Bailey | 411/11 |
| 3,534,651 | 10/1970 | Belfiglio | 411/9 |
| 4,289,061 | 9/1981 | Emmett | 411/34 |

FOREIGN PATENT DOCUMENTS 1156094  5/1958  France .
1433249  4/1976  United Kingdom .

Primary Examiner—Gary L. Smith
Assistant Examiner—Douglas E. Ringel
Attorney, Agent, or Firm—Jones, Day, Reavis & Pogue

[57] ABSTRACT

A load indicator partly collapses under a predetermined compressive load to provide visual and tactile indications that such predetermined load has been reached or exceeded. The indicator has a longitudinal axis, opposite ends, an outer surface and a central cylindrical hole opening outwardly at the opposite ends. A circumferential groove in the outer surface intermediate the ends divides the indicator into first and second integral parts that move toward one another under a predetermined compressive load by collapsing the groove. A recess surrounds the hole at one end of the indicator so that the surface area of the one end is substantially smaller, and spaced outwardly further from the longitudinal axis, than the surface area of the other end.

17 Claims, 3 Drawing Sheets

LOAD INDICATOR

BACKGROUND OF THE INVENTION

This application is a continuation-in-part of U.S. patent application Ser. No. 179,965, filed Apr. 11, 1988, now abandoned.

This application relates to the art of load indicators and, more particularly, to such indicators for providing visual and tactile indications that a predetermined compressive force has been reached or exceeded. The invention is particularly applicable to washer-like members for use with nut and bolt fastener assemblies. However, the invention has broader aspects, and can be used as an indicator in load supporting environments.

Load indicators of known types include an outer circumferential groove that collapses when a predetermined compressive load is reached or exceeded. However, such known devices either have undesirable characteristics or lack certain desirable characteristics. It would be useful to have such a load indicator in which all of the desirable characteristics are advantageously arranged, and with undesirable characteristics being eliminated.

SUMMARY OF THE INVENTION

A load indicator of the type described includes a body member having a longitudinal axis, an outer surface and opposite ends. A central cylindrical hole through the body member opens outwardly at the opposite ends. A circumferential groove in the outer surface intermediate the ends divides the body member into integral first and second parts.

In a preferred arrangement, a recess surrounds the hole at one end of the body member. The recess reduces the surface area of the one end, and spaces same further outwardly from the longitudinal axis.

Under a predetermined compressive load, the first and second integral parts of the body member move toward one another as the groove collapses, to provide visual and tactile indications that the predetermined load has been reached or exceeded.

The circumferential groove has a bottom that extends substantially parallel to the longitudinal axis, and spaced-apart opposite sides that extend substantially parallel to one another and perpendicular to the longitudinal axis. The depth of the groove is preferably at least as great as about 60% of the thickness of the body member as measured from the outer surface to the hole. An integral web between the groove bottom and the hole integrally connects the two parts of the body member, and undergoes plastic deformation when the groove collapses.

The surface areas at the ends of the body member extend substantially perpendicular to the longitudinal axis. The relationship of the depth of the recess in the one end of the body member around the hole, to the distance measured from the one end to the groove, provides enhanced plastic deformation when the groove collapses.

In one arrangement, the recess is substantially frusto-conical, and is inclined to the horizontal at an angle between about 15° to 45°, and most preferably does not vary by more than about 10% from 30°.

The hole is dimensioned for receiving a fastener member or the like with radial clearance before the groove is collapsed. The hole is preferably about 1.05 to 1.10 times the nominal diameter of a cap screw with which it is used. Upon collapse of the groove under the predetermined compressive load, at least the web portion bulges inwardly, and grippingly and sealingly engages around the fastener member.

It is a principal object of the present invention to provide an improved load indicator that gives a visual indication of applied force.

It is another object of the invention to provide a load indicator that gives a tactile indication of applied force.

It is a further object of the invention to provide a load indicator that is not dependent on applied torque.

It is also an object of the invention to provide a load indicator that gives controlled inward deformation of an inner wall.

It is another object of the invention to provide a load indicator having an inwardly deformable wall that is intended to contact a pulling or fastener member.

It is another object of the invention to provide a load indicator having an inwardly deformable wall that is intended to provide a seal.

It is another object of the invention to provide a load indicator having an inwardly deformable wall that is intended to provide gripping action on a fastener or pulling member.

It is another object of the invention to provide a load indicator with a bottom surface that performs locking action.

It is another object of the invention to provide a load indicator having a bottom surface and controlled wall deformation that perform locking action on the fastener or pulling member.

It is another object of the invention to provide a load indicator having a bottom surface and side groove that result in substantially zero load increase during deformation.

It is another object of the invention to provide a load indicator with an upper surface that has a flat bearing surface.

It is another object of the invention to provide a load indicator that is capable of being overloaded without failing.

It is another object of the invention to provide a load indicator that has some spring back to reduce loss of a preload force.

It is another object of the invention to provide a load indicator that improves the spring constant relationship of a cap screw to a joint.

It is another object of the invention to provide a load indicator that reduces the possibility of fatigue failure.

It is another object of the invention to provide a load indicator that may be used on non-threaded pulling or fastener members.

DESCRIPTION OF A PREFERRED EMBODIMENT

Figure 1:
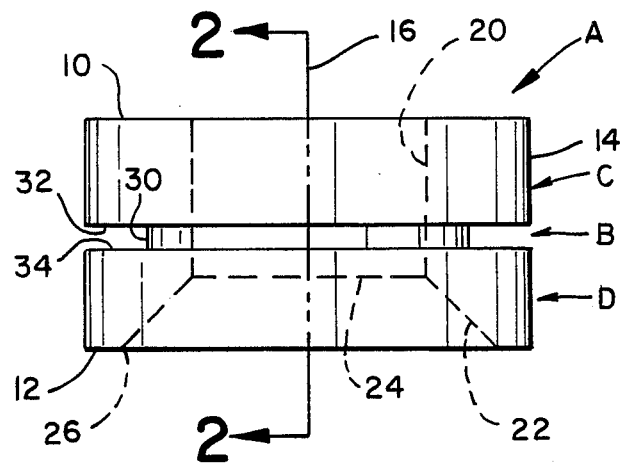
FIG. 1 is a side elevational view of a load indicator constructed in accordance with the present application.
Figure 2:
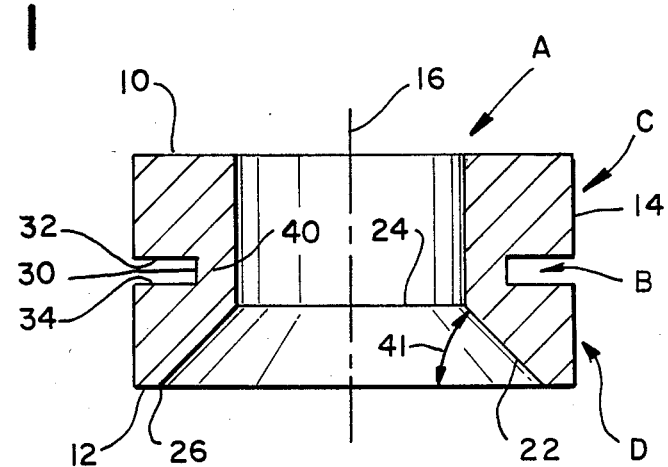
FIG. 2 is a cross-sectional elevational view taken generally on line 2—2 of FIG. 1.

Referring now to the drawing, wherein the showings are for purposes of illustrating a preferred embodiment of the invention only and not for purposes of limiting same, FIG. 1 shows an improved load indicator A constructed in accordance with the present application.

Load indicator A is in the form of a body member having opposite ends 10, 12, a substantially cylindrical outer surface 14 and a longitudinal axis 16. A central cylindrical hole 20 extends through load indicator A coincidental with longitudinal axis 16, and opens outwardly at opposite ends 10, 12. Hole 20 is preferably smooth and unthreaded.

Although load indicator A is substantially cylindrical in a preferred form, it will be recognized that it could have other shapes, such as, without limitation, square or hexagonal. The locking action is enhanced with a hexagonal or similar shape.

A recess 22 extends inwardly from end 12 around hole 20. In the arrangement shown, recess 20 is substantially frusto-conical. However, it will be appreciated that the recess can take other forms. Recess 22 intersects hole 20 at a hole intersection 24, and intersects end 12 at a surface intersection 26.

Ends 10, 12 are in the form of flat end surface areas extending substantially perpendicular to longitudinal axis 16. End surface area 12 is located outwardly from axis 16 a substantially greater distance than end surface area 10. End surface area 12 is also substantially smaller than end surface area 10. End surface area 12 may be adjusted to modify load carrying capabilities within a range of approximately 10–60% of the area of end surface area 10.

A circumferential groove B is formed in outer surface 14 intermediate ends 10, 12. In one arrangement, circumferential groove B is located approximately midway between ends 10, 12. However, other locations are possible. For example, either dimension P or S in FIG. 7 may be approximately 30–50% of overall height W. Groove B has a groove bottom 30 and spaced-apart groove sides 32, 34 that extend substantially parallel to one another and perpendicular to axis 16.

Circumferential groove B divides load indicator A into first and second integral parts C, D that are capable of moving toward one another by collapse of groove B. A relatively thin web 40 is defined between groove bottom 30 and the surface of hole 20 for integrally connecting parts C, D.

The depth of groove B, as measured from outer surface 14 to groove bottom 30 perpendicular to axis 16, is preferably equal to or greater than about 60% of the wall thickness of the load indicator, as measured perpendicular to axis 16 from outer surface 14 to hole 20.

When a compressive load is applied to load indicator A, the resultant force acting on end 12 is spaced outwardly from axis 16 a substantially greater distance than the resultant force acting on end 10. Thus, second part D of the load indicator tends to expand outwardly at end 12 and pivot about web 40 as circumferential groove B begins to close. Continued compression loading substantially closes groove B, and causes web 40 to bulge radially inwardly as indicated at 40a in FIG. 3.

Figure 3:
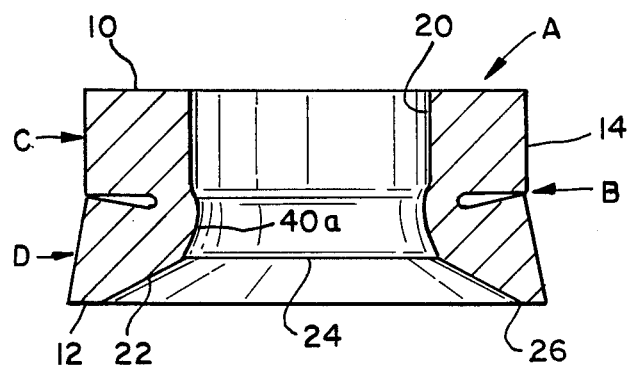
FIG. 3 is a view similar to FIG. 1, and showing the load indicator in a compressed state.

The closing of groove B, as shown in FIG. 3, provides both visual and tactile indications that a predetermined compressive load has been reached or exceeded. With the load indicator compressed, as shown in FIG. 3, there is still some spring back such that if the compressive load were removed, groove B would tend to open slightly. This provides maintenance of preload on a fastener or pulling member used with the load indicator, and performs a lock washer function. Deformation of end 12 also provides good locking action with the surface engaged thereby to prevent rotation and loosening of a fastener member. The spring take up action also improves the relationship of the cap screw spring constant versus the joint spring constant, thereby reducing fatigue failure of the cap screw.

Figure 4:
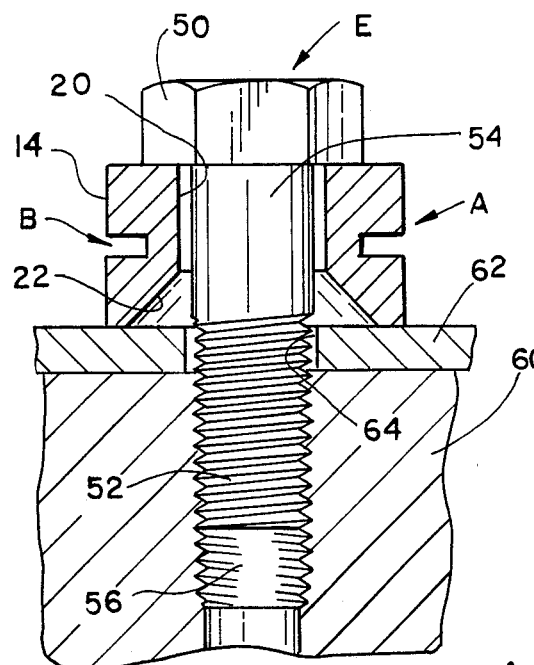
FIG. 4 is a cross-sectional elevational view showing the load indicator beneath the head of a cap screw.

FIG. 4 shows a fastener or pulling member in the form of a cap screw E having a head 50, a threaded shank portion 52 and a smooth shank portion 54. A threaded hole 56 in a base 60 receives threaded shank 52. A member 62 securable to base 60 has a hole 64 therein freely receiving fastener shank 52.

Figure 5:
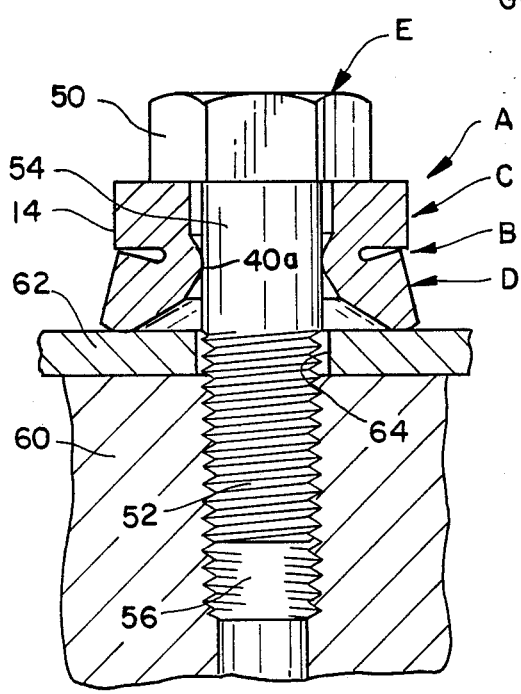
FIG. 5 is a view similar to FIG. 4, and showing the load indicator in a compressed state.

Hole 20 is dimensioned to have a diameter approximately 1.05 to 1.10 times the nominal diameter of the cap screw with which it will be used. This provides radial clearance with smooth shank portion 54, as shown in FIG. 4. The radial clearance is designed such that after deformation of load indicator A, as shown in FIG. 5, inwardly deformed web 40a sealingly engages smooth shank 54 with gripping action. This arrangement provides a seal and also minimizes loosening of the fastener. A smaller diameter hole relative to the nominal diameter of the cap screw may prevent full collapse of the load indicator. A larger diameter hole relative to the nominal diameter of the cap screw may prevent good gripping and sealing of the load indicator around the cap screw.

Load indicator A may be used with a cap screw as shown in FIGS. 4 and 5, or with nut and bolt fastener assemblies. When used with threaded fasteners, sufficient torque is applied to the fastener for collapsing groove B, and this informs the installer that the desired preload or clamping force on the fastener has been reached. Load indicator A can be made of many different materials and many different metals. Also, different heat treatments can be provided in order to have load indicators with a wide variation of strengths.

Figure 6:
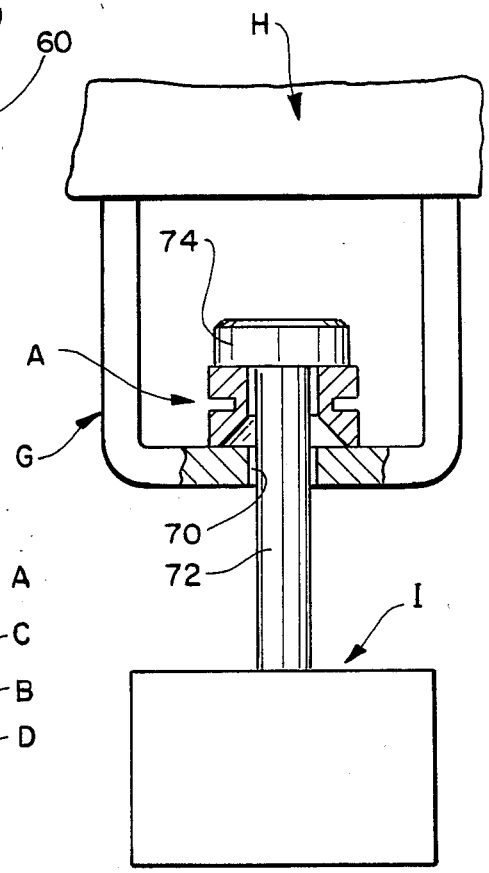
FIG. 6 is a side elevational view, with portions cutaway and in section, showing the load indicator in position on a load bearing support.

FIG. 6 shows a generally U-shaped strap G suspended from a fixed support H and having a hole 70 receiving an elongated rod 72 supporting a load I. A load indicator A is positioned around rod 72 between strap G and an enlarged head 74 on rod 72. If the maximum load capacity of the assembly is reached or exceeded, groove B in load indicator A will close to provide a permanent indication that the load is too heavy. Obviously, load indicators A can also be positioned beneath loads, or supports intended to support loads, for providing an indication when the design strength of the support has been exceeded.

There is a correlation between crush load values and the height of part D, as measured from end surface 12 to groove side 34 parallel to axis 16. Also, adjusting the width of end 12, as measured from outside surface 14 to intersection 26, controls the hoop strength of part D in the vicinity of end 12. The hoop strength is the ability of part D in the vicinity of end 12 to resist outward expansion and deformation. This varies the load carrying ability of part D in the vicinity of end 12. Although angle 41 is variable to vary the crush load values and spring action, it is preferably about 15° to 45°, and most preferably is within about 10% of about 30°.

Figure 7:
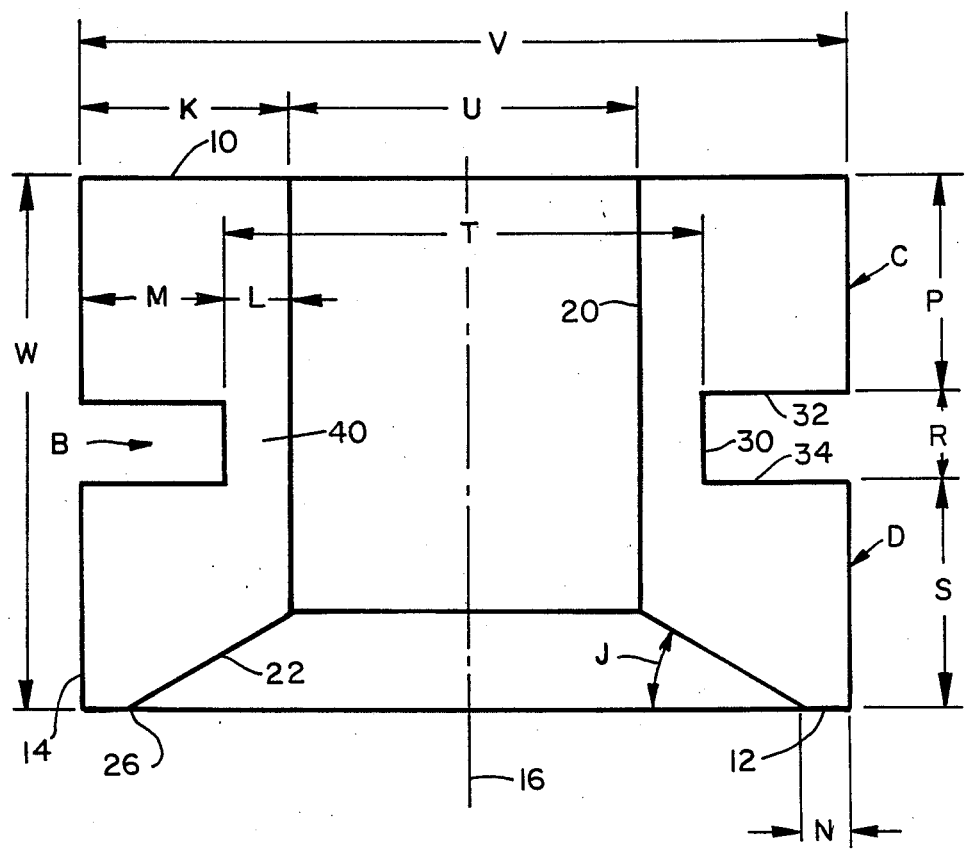
FIG. 7 is an unhatched elevational sectional view used to explain various desired relationships between features of the load indicator.

Referring to FIG. 7, dimension K is not particularly critical, and simply depends upon the size of the load indicator and how it will be used. Obviously, if dimension K is too large, lower portion D will not expand outwardly during collapse as shown in FIG. 3.

Angle J is preferably between 15° and 45°, and most preferably does not deviate by more than a few degrees from about 30°.

Depth M of groove B is preferably at least as great as 60% of dimension K. Holding all other dimensions and angles constant while decreasing groove depth M (down to the lower limit of 60% of K), increases the collapse load capacity of the indicator. If groove depth M is less than about 60% of K, web 40 will not collapse as desired to provide gripping and sealing relationship with a fastener.

The height P of portion C is no particularly critical, but should be around 30-50% of height dimension W. If dimension P is smaller, part C will tend to distort in an unacceptable manner during tightening of a fastener.

Dimension S is preferably around 30-50% of the overall height W of the load indicator. In addition, dimension S should be at least equal to groove width R.

The width R of groove B is preferably larger than the width L of web 40. In part, groove width R is also related to angle J. This is due to the fact that as groove width R increases, angle J should also increase to permit full closure at crush load. For example, if angle J was the minimum of 15°, and groove width R was the maximum, acceptable crushing or collapsing action might not occur.

If all other dimensions are held constant, decreasing angle J tends to have minimal effect on crush strength. However, decreasing angle J has a direct effect on the ability of groove B to crush fully closed, and can also cause the circumference of portion D adjacent end surface 12 to burst. Therefore, around 30° for angle J is the most acceptable. A variation of about 10% above or below 30° would be acceptable for most applications.

The table entitled Basic Dimensions as a Percent of Nominal Cap Screw Diameter provides an example of how the variable dimensions are determined in designing a load indicator for a given application.

| | BASIC DIMENSIONS AS A PERCENT OF NOMINAL CAP SCREW DIAMETER | | | | | | | | | | |
|---|---|---|---|---|---|---|---|---|---|---|---|
| | J FLANGE ANGLE (DEGREES) | U HOLE DIA. | T O.D. OF INNER GROOVE | V O.D. OF SPACER | R GROOVE WIDTH | P TOP HEIGHT | S BOTTOM HEIGHT | W OVERALL HEIGHT | N FLANGE BEARING WIDTH | M GROOVE DEPTH | L WEB | K O.D. TO I.D. WIDTH |
| Max. | 45 | 115 | $2L + U$ | 300 | 25 | 50 | 50 | 125 | 25 | $\frac{V-T}{2}$ | 20 | $\frac{V-U}{2}$ |
| Min. | 15 | 100 | Generally | 180 | 10 | 30 | 30 | 70 | 2 | | 5 | |
| Preferred | 30 | 108 | 115%–150% of U | 200 | 20 | 40 | 40 | 100 | 10 | Generally 26%–41% of W | Chosen for load req. | |
| Example of dimensions for a load indicator to be used with a cap screw having a nominal diameter of ¼", and a chosen L of 15% (L = 15% of ¼" = 0.0375") | 30 | .270" | .345" | .500" | .050" | .100" | .100" | .250" | .025" | .0775" | .0375" | .115" |

One first chooses the nominal diameter of the cap screw one wishes to use. Next, one chooses the width L of web 40. The chosen values of web width L will generally be 5-20% of the nominal diameter of the cap screw depending upon the load requirements. The value chosen for web width L should also meet the requirement that groove depth M should be at least as great as 60% of wall thickness dimension K. Once the nominal diameter of the cap screw and the dimension for web width L have been chosen, the other dimensions can be calculated from the table. If web width L turns out to be more than about 40% of wall thickness K, a new value should be chosen for L, and new calculations run for the other dimensions.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A load indicator comprising a body member having opposite ends with end surface areas, a longitudinal axis and an outer surface extending between said opposite ends, an unthreaded hole through said body member opening outwardly at said opposite ends, a circumferential groove in said outer surface intermediate said ends, said groove extending completely around said outer surface, said groove having a bottom and opposite sides, said body member having a deformable web defined between said groove bottom and said hole, one said end of said body member having a recessed surface therein surrounding said hole such that the surface area of said one end is spaced outwardly from said axis further than the surface area of the other said end, each said end surface area lying in a plane extending substantially perpendicular to said longitudinal axis in both collapsed and uncollapsed conditions, each said end surface area extending completely around and being symmetrical about said longitudinal axis, and said surface area of said one end being not less than approximately 10% of said surface area of said other end in both collapsed and uncollapsed conditions, whereby a predetermined compressive force applied to said body member generally parallel to said axis causes collapse of said groove to provide a visual indication that the predetermined compressive force has been reached and also causes inward bulging of said web so that in the collapsed condition said recessed surface remains out of a plane extending substantially perpendicular to said longitudinal axis.

2. The indicator of claim 1 wherein said surface area of said one end is between about 10% to 60% said surface area of said other end.

3. The indicator of claim 1 wherein the depth of said groove measured perpendicular to said axis is greater than the thickness of said web measured perpendicular to said axis.

4. The indicator of claim 1 wherein said recessed surface is frusto-conical.

5. The indicator of claim 4 wherein said recessed surface slopes upwardly from the horizontal at an angle between 15° to 45°.

6. The indicator of claim 1 wherein said outer surface is substantially cylindrical and said groove sides are substantially parallel to one another and extend substantially perpendicular to said axis.

7. The indicator of claim 1 wherein said hole is dimensioned for receiving a fastener with radial clearance until said groove is collapsed whereupon inward bulging of said web sealing engages around the fastener.

8. A load indicator comprising a body having a longitudinal axis, opposite ends and an outer surface, a central cylindrical hole through said body opening outwardly at ends, a circumferential groove in said outer durface intermediate said ends and dividing said body into first and second parts integrally connected by a web at the bottom of said groove, said groove extending completely around said outer surface, said parts being movable toward one another under a compressive load by plastic diformation of said web and collapse of said groove, a recessed surface in one said end surrounding said hole, each said end having an end surface area extending substantially perpendicular to said axis in both collapsed and uncollapsed conditions, each said end surface area extending completely around and being symmetrical about said longitudinal axis, said end surface area on said one end being outwardly of said recess and being substantially smaller than said end surface area on the other said end so that in the collapsed condition said recessed surface remains out of a plane extending substantially perpendicular to said longitudinal axis.

9. The indicator of claim 8 wherein said recessed surface is frusto-conical.

10. The indicator of claim 9 wherein said recessed surface slopes toward said axis from said one end at an included angle with said one end between 15° to 45°.

11. The indicator of claim 10 wherein said angle is within about 10% of about 30°.

12. The indicator of claim 10 wherein said groove extends inwardly from said outer surface a distance greater than one-half the thickness of said body between said outer surface and said hole.

13. The load indicator of claim 8 wherein said body has a predetermined height between said opposite ends, and said hole has a diameter between about 1 to 1.15 times said height.

14. The load indicator of claim 8 wherein said body has a predetermined height between said opposite ends, and said body has a nominal outer diameter between about 1.8 to 3 times said height.

15. The load indicator of claim 8 wherein said body has a predetermined height between said opposite ends and said groove divides said outer surface into first and second portions each having a height between 30% to 50% of said predetermined height of said body.

16. The load indicator of claim 8 wherein said indicator is for use with a cap screw having a nominal diameter, said hole in said indicator being about 108-115% of said nominal diameter, said groove having a width about 10-25% of said nominal diameter, said web having a thickness radially of said axis of about 5-20% of said nominal diameter, and said end axis area of said one end having a width radially of of about 2-25% of said nominal diameter.

17. The load indicator of claim 16 wherein said indicator is substantially cylindrical and has a height measured along said longitudinal axis, said groove having a depth of about 26-41% of said height, and said indicator having an outer diameter of about 180-300% of said nominal diameter.

* * * * *